«12» United States Patent
Slater (10) Patent No.: US 7,486,435 B2
(45) Date of Patent: Feb. 3, 2009

(54) MULTI-PORT OPTICAL PARAMETRIC OSCILLATOR

(75) Inventor: Richard Craig Slater, Waban, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 11/731,413

(22) Filed: Mar. 30, 2007

(65) Prior Publication Data

US 2007/0236780 A1 Oct. 11, 2007

Related U.S. Application Data

(60) Provisional application No. 60/790,428, filed on Apr. 7, 2006.

(51) Int. Cl.
*G02F 1/35* (2006.01)
*G02F 2/02* (2006.01)

(52) U.S. Cl. ............... 359/330; 372/22; 372/98; 372/105; 359/326

(58) Field of Classification Search ......... 359/326–332; 372/21, 22, 98, 105
See application file for complete search history.

(56) References Cited

U.S. PATENT DOCUMENTS

| 4,200,808 | A | * | 4/1980 | Herbst | 359/329 |
| 5,117,126 | A | * | 5/1992 | Geiger | 359/330 |
| 5,206,874 | A | | 4/1993 | Opower | 372/72 |
| 5,390,211 | A | | 2/1995 | Clark et al. | 372/95 |
| 5,561,550 | A | | 10/1996 | Tanuma | 359/330 |
| 5,640,405 | A | | 6/1997 | Wallace et al. | 372/21 |
| 5,805,626 | A | * | 9/1998 | Komatsu et al. | 372/41 |
| 5,812,305 | A | * | 9/1998 | Blake et al. | 359/330 |

(Continued)

FOREIGN PATENT DOCUMENTS

WO 2004049056 A1 6/2004

(Continued)

OTHER PUBLICATIONS

Russell, S. M., et al.; "Optical Parametric Generation of Greater Than 30 mJ Signal Energies in PPLN Stacks", Conference on Lasers and Electro-Optics Europe—Technical Digest, 2001, pp. xlvvi-xlviii.

*Primary Examiner*—Sung H Pak
*Assistant Examiner*—Daniel Petkovsek
(74) *Attorney, Agent, or Firm*—BainwoodHuang (57) ABSTRACT

An optical parametric oscillator includes a source of coherent energetic pump optical signals and an optical resonator cavity which includes a set of optical parametric amplifying (OPA) crystals and a set of optical elements such as mirrors disposed along an optical path. The optical elements are configured (1) to direct an oscillation optical signal generated by the OPA crystals along the optical path, (2) to provide input coupling of the energetic pump optical signals such that each energetic pump optical signal travels through only one of the OPA crystals to result in a corresponding depleted pump optical signal, and (3) to provide output coupling of the depleted pump optical signals to prevent each depleted pump optical signal from traveling through more than one of the OPA crystals. Resonator cavities have multiple-leg configurations, including "L" and "U" shapes, and either linear (or standing-wave) or ring architectures. The pump source may employ wavefront division or alternatively amplitude division of a single relatively high-power optical pump beam.

11 Claims, 4 Drawing Sheets

U.S. PATENT DOCUMENTS

| | | | |
|---|---|---|---|
| 5,875,053 A | 2/1999 | Webjorn et al. | 359/326 |
| 6,047,011 A * | 4/2000 | Cook | 372/22 |
| 6,052,218 A | 4/2000 | Chandra et al. | 359/333 |
| 6,208,458 B1 | 3/2001 | Galvanauskas et al. | 359/345 |
| 6,215,807 B1 | 4/2001 | Reilly | 372/57 |
| 6,229,828 B1 | 5/2001 | Sanders et al. | 372/22 |
| H1965 H | 6/2001 | Burns et al. | 372/22 |
| 6,791,743 B2 * | 9/2004 | Jovanovic et al. | 359/333 |
| 6,870,664 B2 * | 3/2005 | Jovanovic et al. | 359/333 |
| 2002/0114059 A1 | 8/2002 | Bonfrate et al. | 359/322 |
| 2003/0112492 A1 | 6/2003 | Huang | 359/321 |
| 2003/0112493 A1 | 6/2003 | Jovanovic et al. | 359/330 |
| 2003/0123497 A1 | 7/2003 | Huang et al. | 372/21 |
| 2003/0137719 A1 | 7/2003 | Van Der Veer | 359/330 |
| 2004/0227986 A1 | 11/2004 | Kurz et al. | 359/328 |
| 2007/0013995 A1 * | 1/2007 | Kaertner et al. | 359/330 |
| 2007/0206177 A1 * | 9/2007 | Anschel et al. | 356/28 |

FOREIGN PATENT DOCUMENTS

| | | |
|---|---|---|
| WO | 2004109323 A2 | 12/2004 |

* cited by examiner

MULTI-PORT OPTICAL PARAMETRIC OSCILLATOR

CROSS REFERENCE TO RELATED APPLICATIONS

This Patent Application claims the benefit under 35 U.S.C. § 119(e) of U.S. Provisional Patent Application No. 60/790,428 filed on Apr. 7, 2006 entitled, "MULTI-PORT OPTICAL PARAMETRIC OSCILLATOR", the contents and teachings of which are hereby incorporated by reference in their entirety.

BACKGROUND

One type of nonlinear optical frequency conversion device utilizes the phenomenon of optical parametric amplification in which energy provided at one wavelength in a "pump" optical signal is converted into energy at two other wavelengths of waves commonly referred to as "signal" and "idler" waves. For example, one type of optical parametric amplification (OPA) device employs so-called "quasi-phase matched" (QPM) techniques to produce a phase-matched optical parametric oscillator (OPO) output in the ultraviolet/visible, near infrared or midwave infrared (MWIR) spectral range. QPM devices produce phase-matched output by resetting the phase mismatch of the three optical signals by $\pi$ radians every "coherence length", which for MWIR OPOs may be in the range of 20-40 microns. One method of resetting the phase mismatch is accomplished by anti-parallel domains of electric polarization that alternate in sign every coherence length. Current QPM technology uses ferroelectric crystals (the electric analogue of a ferromagnet where there is a permanent electric moment along a preferred direction) within which a modulated electric domain structure is induced using a photo-lithographically fabricated periodic electrodes. Very high field strengths, such as in the range of 2-20 kV/mm, are utilized to obtain the desired operation. The term "periodic poling" (PP) is used to describe this kind of QPM fabrication.

Current PP QPM technology is limited to crystal structures with thicknesses in the range of 1-5 mm. This limit is imposed by the fundamental dielectric breakdown strength of the ferroelectric crystals. This thickness limitation poses a potentially serious constraint on the utility of PP QPM structures for use in OPOs or other nonlinear frequency converters that are used to generate high pulse energy output. The limitation is based on the fact that the limited cross sectional area A of the QPM device (approx. 0.1-0.3 $cm^2$) restricts both the maximum pump pulse energy and output pulse energy to a value imposed by a product (F*A) of the cross sectional area A and an optical damage limit F for a typical QPM device, which may be in the range of F=3-10 $J/cm^2$ for example.

SUMMARY

In accordance with the disclosed technique, a relatively high-energy pump beam is divided into lower-energy pump beam components, and each component is used to pump a different one of a plurality of OPA crystals of an optical parametric oscillator. This may be accomplished for example by "wavefront division" using special graded reflectivity mirrors (GRMs) to reflect a limited sub-aperture of the entire wavefront. Another approach is to divide the pump beam by a reduction in amplitude/intensity using, for example, polarizing or dichroic beam splitters, which is called amplitude division. High-power operation is achieved without surpassing optical damage limits of individual OPA crystals.

Specifically, disclosed is an optical parametric oscillator that includes a source of a set of coherent energetic pump optical signals, and an optical resonator cavity which includes a set of optical parametric amplifying (OPA) crystals disposed along an optical path and a corresponding set of optical elements disposed along the optical path. The optical elements, which may include graded-reflectivity or other mirrors for example, are configured (1) to direct an oscillation optical signal generated by the OPA crystals along the optical path, (2) to provide input coupling of the energetic pump optical signals such that each energetic pump optical signal travels through a corresponding distinct one of the OPA crystals to result in a corresponding depleted pump optical signal, and (3) to provide output coupling of the depleted pump optical signals to prevent each depleted pump optical signal from traveling through more than one of the OPA crystals.

Specific embodiments of the optical parametric oscillator employ resonator cavities having multiple-leg configurations with each leg containing a corresponding OPA crystal. "L"-shaped and "U"-shaped cavities are shown. Also, both linear (or standing-wave) architectures as well as ring architectures are shown. A disclosed pump source employing wavefront division utilizes a set of mirrors offset from each other across the wavefront of a single relatively high-power optical pump beam, whereas an alternative pump source employs amplitude division by extracting the pump optical signals from different points of a laser resonant cavity.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
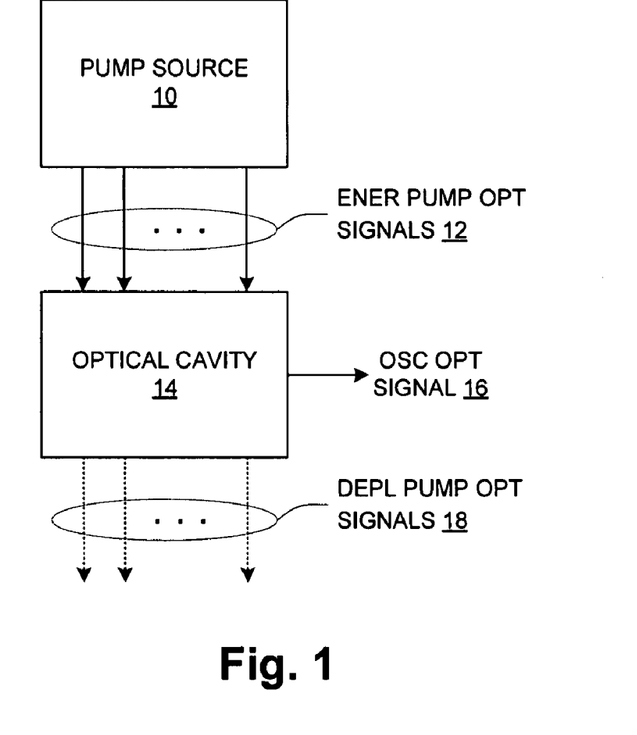
FIG. 1 is a block diagram of a multi-port optical parametric oscillator according to an embodiment of the present invention.

FIG. 1 shows an optical parametric oscillator in a generalized form. A pump source 10 generates a plurality of coherent, energetic pump optical signals (ENER PUMP OPT SIGNALS) 12, which are provided to an optical cavity 14 that utilizes the energetic pump optical signals 12 to generate an oscillator optical signal (OSC OPT SIGNAL) 16, which is the desired output of the optical oscillator. The oscillator optical signal 16 is one of either the "signal" or "idler" waves generated in the parametric amplification process, as described in more detail below. The optical cavity 14 also generates depleted pump optical signals (DEPL PUMP OPT SIG- NALS) 18 which are by-products of parametric amplification occurring within the optical cavity 14 such as described below.

Generally, one benefit of the optical parametric oscillator of FIG. 1 is its ability to generate the oscillator optical signal 16 of greater power than can be generated when only a single pump optical signal is utilized. In order to prevent damage to the optical parametric amplification (OPA) crystals within the optical cavity 14, the optical power density experienced by each crystal is kept below a damage limit. The optical cavity 14 employs multiple OPA crystals pumped by separate pump optical signals, so that each crystal receives only a fraction of the overall pump energy provided by the pump source 10. A high-power output is obtained by utilizing a correspondingly high amount of pump power but distributing this power among multiple crystals such that the power density within each crystal is maintained below the damage limit.

Figure 2:
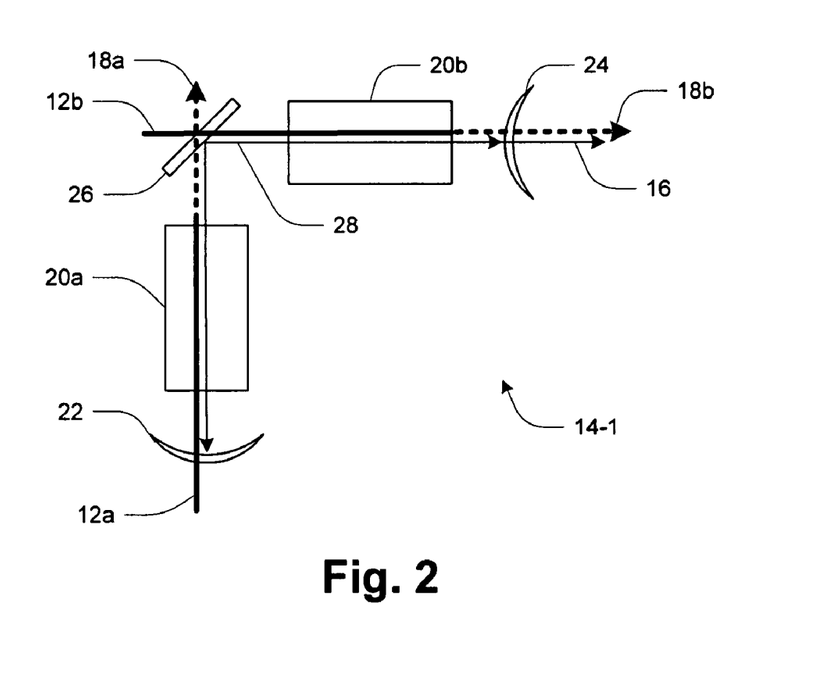
FIGS. 2-3 are schematic diagrams of embodiments of an optical cavity in the optical parametric oscillator of FIG. 1.

FIG. 2 illustrates an embodiment 14-1 of the optical cavity 14. The optical cavity 14-1 has an "L" configuration having two separate legs lying along different geometric axes. Each leg includes a respective OPA crystal 20 (shown as crystals 20a, 20b for legs "a" and "b" respectively). Also included are end mirrors 22, 24 and an internal mirror 26. In the illustrated embodiment, the end mirrors 22, 24 are spherical sections such that the overall cavity forms an unstable resonator, as that term is known in the art. At the frequency of the oscillator optical signal 16, the end mirror 22 as well as the internal mirror 26 are fully reflective, and the end mirror 24 is only partially reflective. As generally known in the art, this provides for the out-coupling of the desired oscillator optical signal 16 as well as feeding back some fraction of the optical energy generated within the cavity to maintain oscillation (indicated by reference number 28). The oscillator optical signal 16 may be either the so-called "signal" or "idler" wave generated in the optical parametric amplification process, and is also referred to herein as the "resonated wave". It is preferred that the non-resonated wave (e.g., the idler wave if the signal wave is resonated) generated within a given OPA crystal 20 be coupled out of the optical cavity 14 and not enter other OPA crystals 20 of the oscillator. Although the non-resonated wave is not explicitly shown, in the embodiment of FIG. 2 the non-resonated wave generated within OPA crystal 20a exits via mirror 26, and the non-resonated wave generated in OPA crystal 20b exits via mirror 24. Extracting the non-resonated wave in this manner insures that a desired phase synchronization between all three waves will be retained. In the remaining description below it is to be understood that the non-resonated wave is being extracted from the cavity 14.

A respective energetic pump optical signal 12 (12a, 12b) is passed through each crystal 20. This is accomplished partly by the geometry of the oscillator as well as the characteristics of the mirrors 22, 24 and 26. Each energetic pump optical signal 12 is directed along an axis along which the corresponding crystal 20 lies, and the mirrors 22, 24 and 26 provide for both input coupling of the energetic pump optical signals 12 as well as the output coupling of the depleted pump optical signals 18 such that each energetic pump optical signal 12 is used to pump only one crystal 20. Thus energetic pump optical signal 12a, for example, passes through end mirror 22 and the crystal 20a, and exits crystal 20a as depleted pump optical signal 18a which then exits the cavity 14 through the internal mirror 26. Similarly, energetic pump optical signal 12b passes through internal mirror 26 and the crystal 20b, and exits crystal 20b as depleted pump optical signal 18b which then exits the cavity 14 through the end mirror 24.

Any of a variety of OPA crystals 20 may be utilized. General classes include phase-matching materials and so-called "quasi-phase-matched" or QPM materials. QPM crystals may be of the "periodically poled" type and/or utilize a variety of OPA materials such as lithium niobate.

Figure 3:
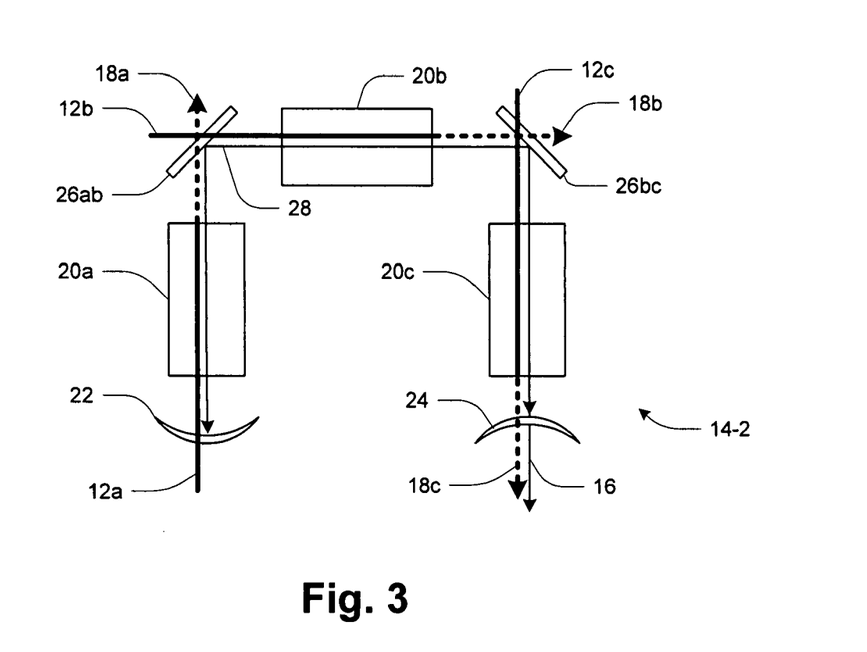

FIG. 3 illustrates an embodiment 14-2 of the optical cavity 14 that has a "U" configuration employing three legs (a, b and c). It will be appreciated that the approach can be extended to an arbitrary number of legs each having an independently pumped crystal 20. The arrangements can be two-dimensional as those of FIGS. 2 and 3, or three dimensional in alternative embodiments.

Figure 4:
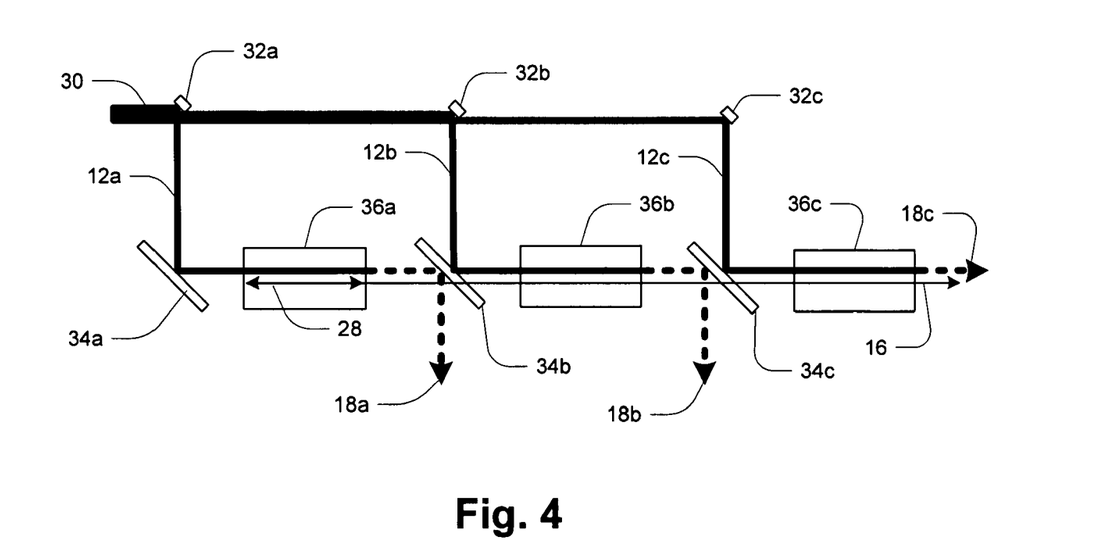
FIG. 4 is a schematic diagram of an embodiment of the optical parametric oscillator of FIG. 1.

FIG. 4 illustrates an embodiment of the oscillator of FIG. 1 that employs a technique referred to as "wavefront division" for generating the energetic pump optical signals 12. A single relatively high-power pump optical signal 30 impinges on a set of mirrors 32 (shown as 32a-32c) that are offset from each other across the width of the pump optical signal 30. Each successive mirror 32 reflects the corresponding portion of the wavefront of the pump optical signal 30 to generate the corresponding energetic pump optical signal 12 (e.g., signal 12a is generated by mirror 32a, etc.). Mirrors 34 (shown as 34a-34c) operate to transmit the optical energy 28 within the cavity while reflecting the pump beams 12 and 18 such that each energetic pump optical signal 12 is steered through a corresponding optical parametric device 36 and the depleted pump optical signals 18a, 18b are directed out of the cavity after exiting the corresponding device 36.

FIG. 4 also illustrates a configuration of the overall oscillator in which one leg (the leftmost leg "a" in FIG. 4) includes an optical parametric device 36a that is configured as an optical parametric oscillator, while in successive downstream legs ("b" and "c" in FIG. 4) the optical parametric devices 36 are configured as optical parametric amplifiers only (as in the embodiments of FIGS. 2-3). It will be appreciated that each optical parametric device 36 includes one or more OPA crystals (not shown) such as crystals 20, and that the optical parametric device 36a configured as an optical parametric oscillator includes mirrors and/or other elements (not shown) that contribute to maintaining oscillation.

Figure 5:
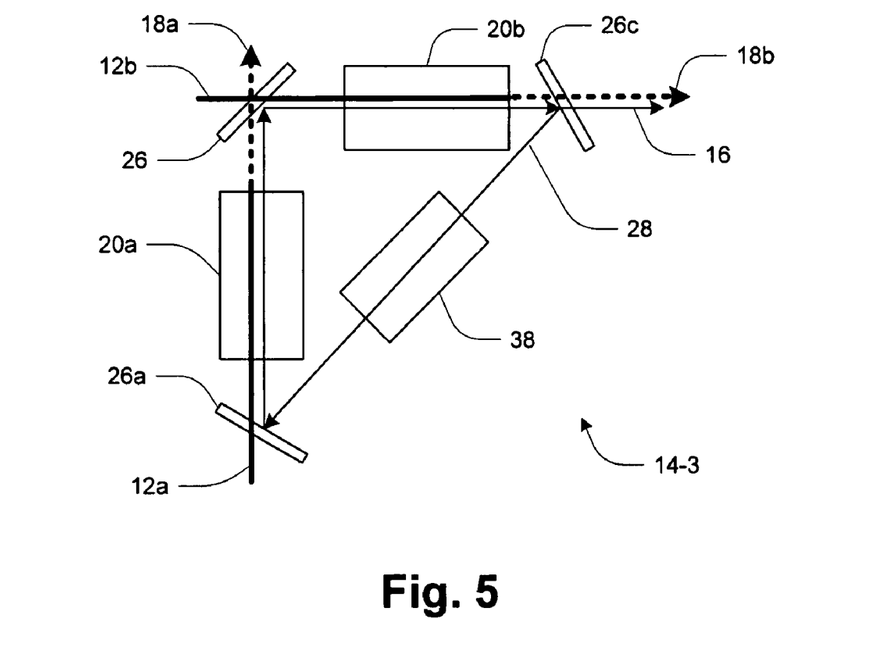
FIGS. 5-6 are schematic diagrams of other embodiments of the optical cavity in the optical parametric oscillator of FIG. 1.
Figure 6:
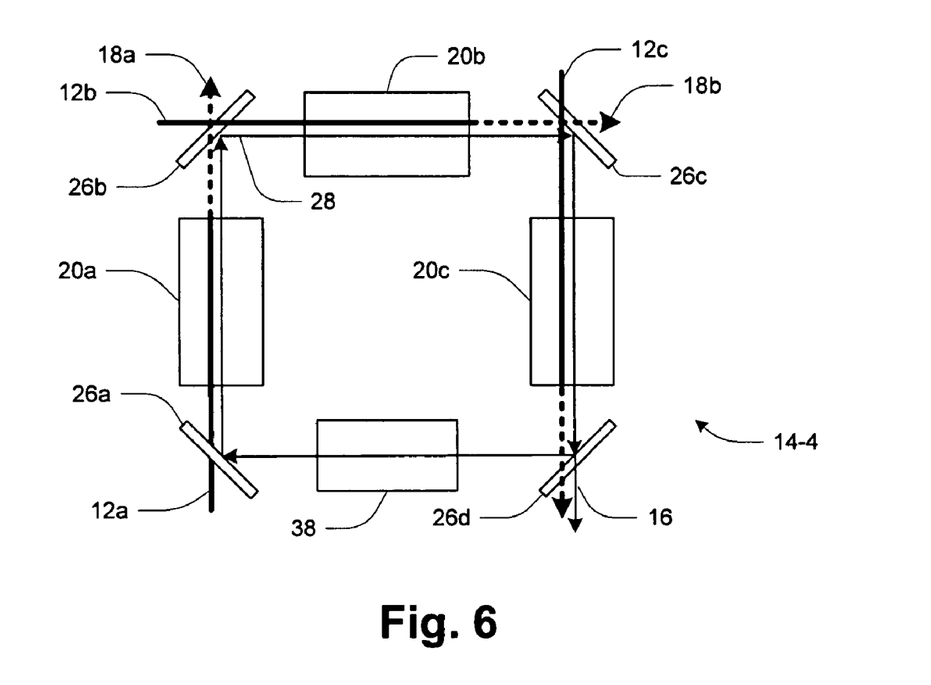

FIGS. 5 and 6 illustrate alternative oscillators 14-3 and 14-4 respectively that employ a ring architecture versus the linear or "standing wave" architecture of the oscillators 14-1 and 14-2. The desired oscillatory optical energy 28 is shown circulating in a clockwise direction, with the oscillator optical signal 16 exiting via one of the mirrors 26. In each oscillator 14-3 and 14-4, a collimated beam expander 38 is utilized in the non-pumped leg.

Figure 7:
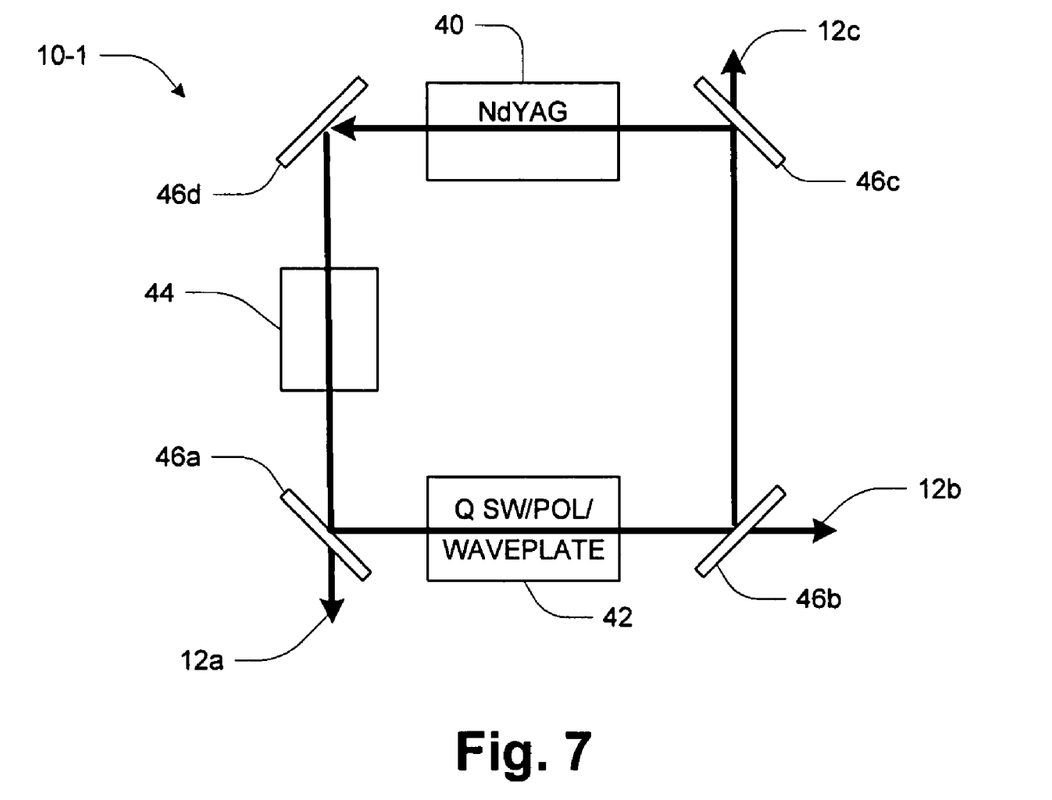
FIG. 7 is a schematic diagram of an embodiment of a pump source in the optical parametric oscillator of FIG. 1.

FIG. 7 illustrates an embodiment 10-1 of the pump source 10, specifically a ring unstable cavity laser. In contrast to the wavefront division approach of FIG. 4, the illustrated source 10-1 employs "amplitude division", i.e., deriving the energetic pump optical signals 12 as separate amplitude components of a single pump beam. An NdYAG crystal (NdYAG) 40 is employed as a lasing element in one of the legs. A Q switch, polarizer and waveplate (collectively ref. 42) are disposed in another leg, and a collimating beam expander 44 in yet another. Three coherent energetic pump optical signals 12 (12a-12c) are extracted via respective partially transmissive mirrors 46 (46a-46c).

While various embodiments of the invention have been particularly shown and described, it will be understood by those skilled in the art that various changes in form and details may be made therein without departing from the spirit and scope of the invention as defined by the appended claims.

For example, although the above-discussed embodiments employ mirrors such as mirrors 26 and 34 for internal beam steering, it will be appreciated that alternative embodiments may employ alternative types of optical elements, which may include for example prisms, diffractive elements, etc. Other variations are also possible.

What is claimed is:

1. An optical parametric oscillator, comprising:
a source of a plurality of coherent energetic pump optical signals; and
an optical resonator cavity including:
a plurality of optical parametric amplifying (OPA) crystals disposed in series along an optical path; and
a plurality of optical elements disposed along the optical path, the optical elements being configured (1) to direct an oscillation optical signal generated by the OPA crystals along the optical path, (2) to provide input coupling of the energetic pump optical signals such that each energetic pump optical signal travels through a corresponding distinct one of the OPA crystals to result in a corresponding depleted pump optical signal, and (3) to provide output coupling of the depleted pump optical signals to prevent each depleted pump optical signal from traveling through more than one of the OPA crystals,
wherein the optical path of the optical resonator has multiple pumped legs arranged at non-zero angles with respect to each other, each pumped leg including a respective one of the OPA crystals, and wherein corresponding ones of the optical elements comprise mirrors arranged between adjacent pairs of the legs, the mirrors being reflective with respect to the oscillator optical signal but transmissive with respect to the energetic and depleted pump optical signals,
wherein the oscillation optical signal is a resonated wave that contains only one of a signal wave and an idler wave,
wherein a non-resonated wave generated by each OPA crystal along the optical oath is separated from the resonated wave and exits the optical resonator cavity with the depleted pump signal for each corresponding OPA crystal, the non-resonated wave containing the other of the signal wave and the idler wave contained by the resonated wave.

2. An optical parametric oscillator according to claim 1 wherein the source employs amplitude division of a relatively high-power pump optical signal to generate the plurality of energetic pump optical signals.

3. An optical parametric oscillator according to claim 2 wherein the source includes a multiple-leg optical cavity and each of the energetic pump optical signal comprises a fraction of an optical signal appearing in a corresponding leg of the optical cavity.

4. An optical parametric oscillator according to claim 1 wherein the source employs wavefront division of a relatively high-power pump optical signal to generate the plurality of energetic pump optical signals.

5. An optical parametric oscillator according to claim 4 wherein the source includes a plurality of mirrors offset from each other across the wavefront of the relatively high-power pump optical signal, such that each mirror reflects a corresponding portion of the relatively high-power pump optical signal to generate a corresponding one of the plurality of energetic pump optical signals.

6. An optical parametric oscillator according to claim 1 wherein the OPA crystals comprise periodically poled, quasi-phase-matched crystals.

7. An optical parametric oscillator according to claim 6 wherein the OPA crystals are made of lithium niobate.

8. An optical parametric oscillator according to claim 1 wherein the optical path of the optical resonator cavity has two straight pumped legs arranged at substantially 90 degrees with respect to each other,
wherein the plurality of optical elements includes a first end mirror, a second end mirror, and an internal mirror, the first end mirror and the second end mirror shaped as spherical sections,
wherein a first energetic pump optical signal enters the first end mirror and a first OPA crystal and exits the first OPA crystal as a first depleted pump optical signal which exits the optical resonator cavity at the internal mirror, and
wherein a second energetic pump optical signal enters the internal mirror and a second OPA crystal and exits the second OPA crystal as a second depleted pump optical signal which exits the optical resonator cavity at the second end mirror.

9. An optical parametric oscillator according to claim 1 wherein the optical path of the optical resonator cavity has three straight pumped legs arranged at substantially 90 degrees with respect to each other,
wherein the plurality of optical elements includes a first end mirror, a second end mirror, a first internal mirror, and a second internal mirror, the first end mirror and the second end mirror shaped as spherical sections,
wherein a first energetic pump optical signal enters the first end mirror and a first OPA crystal and exits the first OPA crystal as a first depleted pump optical signal which exits the optical resonator cavity at the first internal mirror,
wherein a second energetic pump optical signal enters the first internal mirror and a second OPA crystal and exits the second OPA crystal as a second depleted pump optical signal which exits the optical resonator cavity at the second internal mirror, and
wherein a third energetic pump optical signal enters the second internal mirror and a third OPA crystal and exits the third OPA crystal as a third depleted pump optical signal which exits the optical resonator cavity at the second end mirror.

10. An optical parametric oscillator according to claim 1 wherein the optical path of the optical resonator cavity has two straight pumped legs arranged at substantially 90 degrees with respect to each other and one straight non-pumped leg arranged at substantially 45 degrees with respect to each pumped leg,
wherein the plurality of optical elements includes a first internal mirror, a second internal mirror, and a third internal mirror,
wherein the non-pumped leg includes a collimated beam expander,
wherein a first energetic pump optical signal enters the first internal mirror and a first OPA crystal and exits the first OPA crystal as a first depleted pump optical signal which exits the optical resonator cavity at the second internal mirror, and
wherein a second energetic pump optical signal enters the second internal mirror and a second OPA crystal and exits the second OPA crystal as a second depleted pump optical signal which exits the optical resonator cavity at the third internal mirror.

11. An optical parametric oscillator according to claim 1 wherein the optical path of the optical resonator cavity has three straight pumped legs and one straight non-pumped leg arranged at substantially 90 degrees with respect to each other, wherein the plurality of optical elements includes a first internal mirror, a second internal mirror, a third internal mirror, and a fourth internal mirror, wherein the non-pumped leg includes a collimated beam expander, wherein a first energetic pump optical signal enters the first internal mirror and a first OPA crystal and exits the first OPA crystal as a first depleted pump optical signal which exits the optical resonator cavity at the second internal mirror, wherein a second energetic pump optical signal enters the second internal mirror and a second OPA crystal and exits the second OPA crystal as a second depleted pump optical signal which exits the optical resonator cavity at the third internal mirror, and wherein a third energetic pump optical signal enters the third internal mirror and a third OPA crystal and exits the third OPA crystal as a third depleted pump optical signal which exits the optical resonator cavity at the fourth internal mirror.

* * * * *

UNITED STATES PATENT AND TRADEMARK OFFICE
CERTIFICATE OF CORRECTION

| | |
|---|---|
| PATENT NO. | : 7,486,435 B2 |
| APPLICATION NO. | : 11/731413 |
| DATED | : February 3, 2009 |
| INVENTOR(S) | : Richard Craig Slater |

It is certified that error appears in the above-identified patent and that said Letters Patent is hereby corrected as shown below:

Claim 1, Column 5, Line 37, "crystal along the optical oath is separated from the" should read --crystal along the optical path is separated from the--.

Signed and Sealed this

Seventeenth Day of March, 2009

JOHN DOLL
*Acting Director of the United States Patent and Trademark Office*